INVENTOR.
RONALD A DELANEY
KARL J. PUTTLITZ
BY Joseph L. Spiegel
ATTORNEY

Oct. 3, 1967 R. A. DELANEY ETAL 3,345,596

HYGROMETER AND METHOD OF FABRICATION

Filed Nov. 8, 1965 3 Sheets-Sheet 2

United States Patent Office 3,345,596

Patented Oct. 3, 1967

3,345,596

HYGROMETER AND METHOD OF FABRICATION

Ronald A. Delaney, Wappingers Falls, and Karl J. Puttlitz, Kingston, N.Y., assignors to International Business Machines Corporation, Armonk, N.Y., a corporation of New York Filed Nov. 8, 1965, Ser. No. 506,803
5 Claims. (Cl. 338—35)

ABSTRACT OF THE DISCLOSURE

Heterogeneous cobalt oxide powder is mixed with an inert liquid vehicle, deposited in paste form on a ceramic dielectric and fired above 1350° C. and preferably 1450° C.–1550° C. to form a hygroscopic element consisting of cobaltous oxide CoO having a highly crystalline absorbent surface. After cooling, electrodes are applied to complete formation of a hygrometer.

This invention relates to hygroscopic elements, electronic microminiature humidity sensing devices and methods of fabrication.

Humidity sensing devices or hygrometers are useful in many diverse applications where it is either necessary or desirable to measure or control relative humidity. (The term "relative humidity" is defined herein as the ratio of the quantity of vapor actually present in the atmosphere to the greatest amount possible at a given temperature.) One such application would be in connection with the microminiaturized circuit module of the type described on pages 102–114 of the IBM Journal of Research and Development (April 1964). The hygrometer serves as a warning device to detect possible leaks and rising humidity conditions within the module region that would damage one or more of the functional components of the module.

Typically, a microminiaturized circuit module is a one-half inch square substrate of only a fraction of an inch in thickness, having functional components on its surface electrically connected with printed wiring. The functional components are devices which include one or more active or passive electric circuit elements fabricated as an integrated structure and capable of performing useful functions or operations. The active devices, as one example, secured to the substrate are generally on the order of 25 x 25 to 300 x 300 mils. The printed conductive elements or wiring between the active and passive devices are in width 5 to 15 mils or less and in thickness 0.5 to 1.5 mils.

The prior art hygrometers intended for microminiature applications are characterized by the provision of a metal base member forming a first electrode, a surface coating on the base member forming a suitable hygroscopic material and a metal film coating on the hygroscopic coating forming a second electrode. Changes in capacitance and resistance between the two electrodes are proportional to changes in relative humidity.

Apart from the fact that they are quite expensive, these prior art hygrometers have proved to be incompatible with the microminiature circuit modules. In the first place they are too bulky, that is, they require a disproportionately large amount of surface area on the circuit module substrate. Secondly, circuit modules are frequently packaged, e.g. aluminum canned, coated, encapsulated, etc. The prior art hygrometers cannot sense relative humidity in these immediate environs without causing perturbations to it.

In addition, prior art hygrometers are not reversible, that is, they will absorb moisture indicating its presence, but with lowering of relative humidity they are not capable of evaporation at all or without substantial deviation. Others, while reversible, are temperature dependent (they will provide an accurate reading only at a given temperature or for a given limited temperature range) or their responsive drifts with time.

Still other disadvantages inherent in the prior art are in the methods of preparing the hygroscopic material and in fabricating the hygrometer. For example, to minimize response drift to an unobjectionable level, the hygroscopic material must be aged and cured. The base member upon which the hygroscopic material is deposited must be carefully formed in that its dimensions are somewhat critical to the operation of the device. Likewise, the dimensions of the hygroscopic coating are critical in that variable sensing abilities are provided according to hygroscopic coating area.

An object of the present invention is a hygroscopic element having good moisture sensitive properties.

Another object of the present invention is a simple and inexpensive method of fabricating hygroscopic elements.

A further object of the present invention is a humidity sensing device which is compatible with microminiaturized circuit modules, has a simple exponential relationship with relative humidity, negligible temperature sensitivity, and resists mositure damage.

A still further object of the present invention is a simple and inexpensive method of fabricating humidity sensing devices.

It is known from U.S. Patent 2,633,521, issued Mar. 21, 1953, that the oxide of cobalt can be used as a conductive material having a high temperature coefficient of resistance in the fabrication of thin film thermistors. The material is mixed with a temporary binder and solvent to form a paste. A film of this thermistor paste is sandwiched between thin films of electrode paste. The paste is dried at room temperature to evaporate the solvent, the temperature is raised to 600° C. to drive off the binder, and rapidly raised to 1100° C. to effect sintering. The oxides of other materials may be also used for the thermistor material, and, depending on the material used the temperature may be further raised to 1100–1450° C. to complete sintering. The complete thermistor material sintering temperature in the case of the oxide of cobalt is approximately 1250° C. The resulting material is extremely temperature dependent while insensitive to moisture.

In one series of experiments, however, a heterogenous mixture of cobalt oxide powder was fired at higher and higher temperatures and it was observed that the material quite unexpectedly underwent a phase change accompanied by a substantial decrease of temperature dependency when fired above 1350° C. While no longer temperature dependent, the material exhibited extremely high, stable and reproducible mositure sensitivity. The phase change referred to was from cobalt-cobaltic oxide ($Co_3O_4$) material having an amorphous surface to cobaltous oxide (CoO) having a highly crystalline surface.

The present invention, in accordance with its broadest aspects, obviates the above mentioned and other difficulties in the prior art as well as accomplishes the foregoing objects by providing a mixture adapted to be deposited and fired on a ceramic dielectric to form a hygroscopic element thereon comprising cobalt oxide powder and an inert liquid vehicle. The mixture is applied in paste form to the dielectric, fired at a temperature above 1350° C. to form the hygroscopic element consisting of cobaltous oxide having a highly crystalline adsorbent surface. After cooling, electrodes are applied to complete the hygrometer.

The resulting hygrometer has a simple exponential relationship with relative humidity varying 4 to 5 orders of magnitude in electrical resistance from 0% to 100% relative humidity. Its temperature coefficient is less than 0.01% per degree of relative humidity. It is completely reversible with negligible hysteresis, not effected by air pollutants and can withstand submersion in water without permanent effect. Moreover, it is capable of detecting dew deposits (nucleation of water vapor droplets) and coalescent deposits (accumulation of dew deposits into larger lenticular drops), that is, it is able to measure and indicate moisture above 100% relative humidity.

One feature of the present invention is in the method of forming a hygrometer, mixing cobalt oxide powder with an inert liquid vehicle into paste form, applying the paste to a dielectric, firing the paste on the dielectric at a temperature above 1350° C. but bellow the melting point of the dielectric to form a hygroscopic element thereon and cooling the element to room temperature.

Another feature of the present invention is in the method feature described above, the additional step of applying electrodes to the element to form the hygrometer.

A further feature of the present invention is a hygrometer including a dielectric having a hygroscopic material overlay thereon forming a hygroscopic element, the overlay comprising finely divided cobaltous oxide having a crystalline adsorbent surface.

A still further feature of the present invention is in the hygrometer feature described above, electrodes applied to the dielectric, separated by and contiguous with the overlay.

The foregoing and other objects, features and advantages of the invention will be apparent from the following more particular description of the preferred embodiments of the invention as illustrated in the accompanying drawings.

Figure 1:
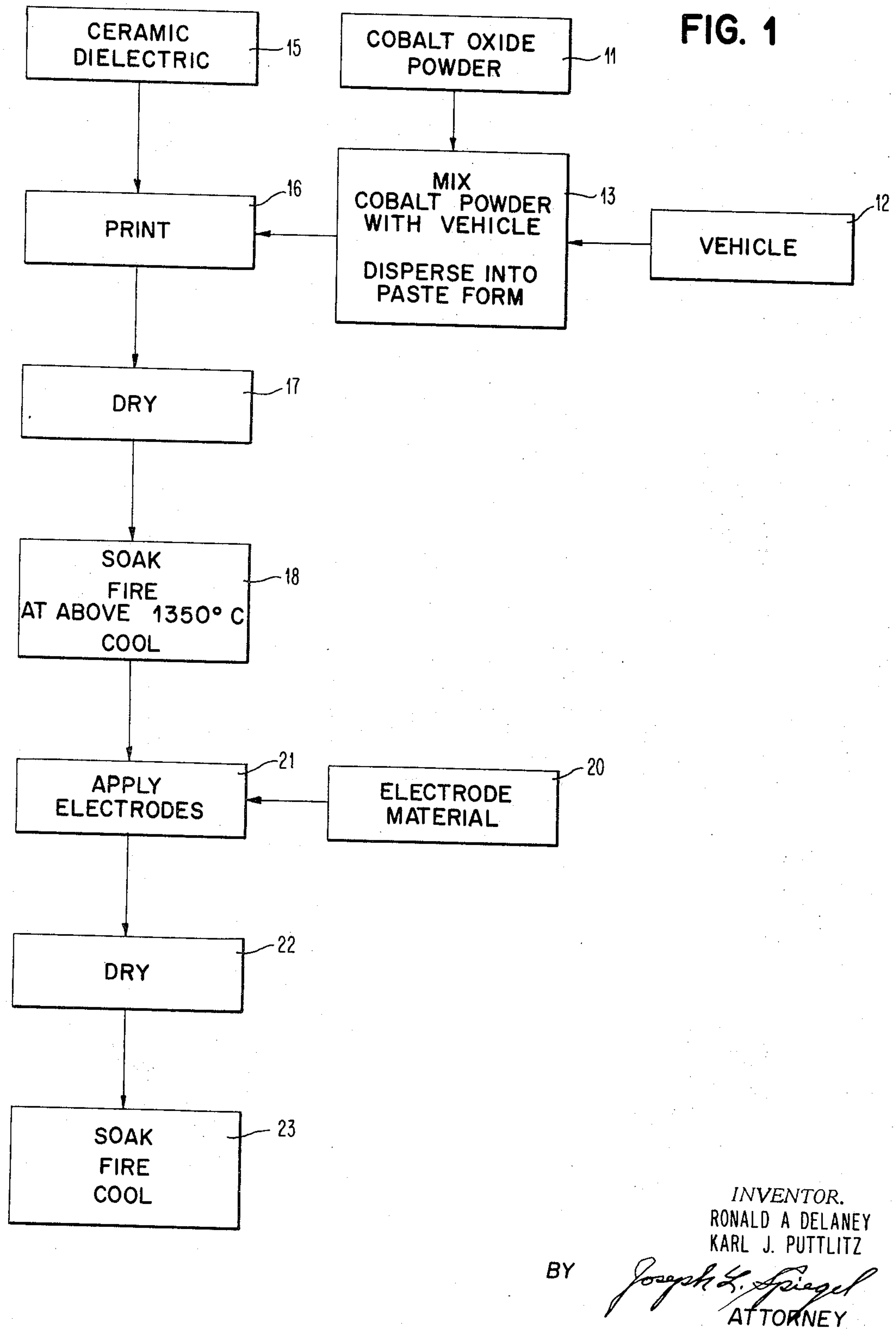
FIGURE 1 is a flow diagram illustrating the method required for fabricating the hygrometer of the present invention.
Figure 2:
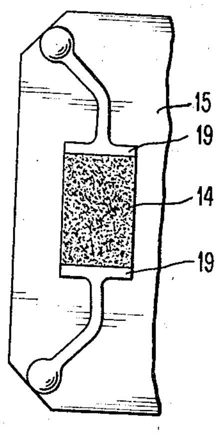
FIGURE 2 is a plan illustration of a microminiaturized circuit module with the novel hygrometer of the present invention attached thereto.

Referring to the flow diagram of FIGURE 1 there is shown a summary of the method of fabricating a hygrometer such as shown on the module in FIGURE 2. Heterogeneous cobalt oxide powder 11 is obtained directly from commercially available sources, or in any well known manner such as by decomposing one of the Co salts, cobalt carbonate, cobalt acetate, etc. In several experiments cobalt carbonate was decomposed in air at 1000° C. and this proved to be a completely satisfactory source of powder. The powder is now ready to be mixed with a vehicle 12.

The vehicle can be any suitable inert liquid which normally includes a vaporizable solid, a resinous binder and a solvent for the vaporizable solid and binder. The vaporizable solid in the vehicle results in dimensional stability of the printed line. Examples of applicable vaporizable solids are terepthalic acid, furoic acid and ammonium suphate. The binder material is used to retain the powder on the dielectric when the solvent and a vaporizable solid have been removed. Examples of binders include natural gums, synthetic resins, cellulose resinous materials and the like. The solvent imparts the desired viscosity to the printing paste and is selected so that it will dissolve the binder and dissolve or disperse the vaporizable solid used in the vehicle. Commonly used solvents are the higher boiling paraffins, cycloparaffins and aromatic hydrocarbons or mixtures thereof; or one or more of the mono- and di-alkyl ethers of diethylene glycol or their derivatives such as diethylene glycol monobutyl ether acetate. The elements of the vehicle are premixed into solution before mixing with the cobalt oxide powder. In several experiments a vehicle of 94% beta-terpineol and 6% ethyl cellulose was used and this proved to be completely satisfactory.

The cobalt powder and vehicle are combined in a weight ratio that permits good screenability, typically, 70–75% powder to 30–25% vehicle and are thoroughly and homogeneously mixed until a paste of the desired viscosity is formed in the method step 13. Standard mixing apparatus may be used as mortar and pestle, a blade type mixer or the like until the powder attains an agglomerate particle size on the order of 0.1 to 0.3 mil. Where large scale production is contemplated a milling step is normally required. In this instance, a three roll mill is preferably used to further disperse the oxide powder in the vehicle. The mill temperature should not be allowed to rise much above room temperature to avoid excess volatilization of the vehicle. However, it should be pointed out that the paste, if kept in a closed container, has a long shelf life. The paste is removed from the mill and is now ready for application to the dielectric.

A hygroscopic element is printed onto the dielectric, such as the hygroscopic element pattern 14 on dielectric substrate 15 in FIGURE 2 by silk screening or other conventional printing processes as step 16. The substrate 15 is, of course, thoroughly cleaned and free from grease or other extraneous material before printing is attempted. A silk screen having the desired pattern is placed over the clean substrate. The paste is squeegeed, doctored or extruded onto the screen. Pressure is applied to spread the paste through the screen and onto the substrate. The pattern in the screen is reproduced at a thickness determined by a number of variables, for example, squeegee pressure and angle, paste viscosity, screen openings, mask thickness, etc. The screen is removed from the substrate and the printed paste composition is dried as indicated at step 17 at room temperature or above. Most of the liquid is thereby removed and the resulting printed pattern is a solid.

The firing step 18 includes a cycle of soaking, firing and cooling. The period during which the temperature of the printed paste on the substrate is gradually being increased to that of the firing temperature is called the soaking period. It is during the soaking period that the last traces of the solvent of the paste evaporate. Then, as the temperature increases, the vaporizable solid in the vehicle completely sublimes. Finally, the binder constituent is decomposed and substantially removed from the paste as gaseous combustion products. The powder fuses at the firing temperature to produce a durable fired hygroscopic element pattern on the dielectric substrate. The dielectric substrate, having the fused pattern thereon, is then brought to room temperature.

Neither time of firing and cooling the hygroscopic composition, nor the environment in which these steps are carried out appear to be critical. For example, the composition can be fired from a few minutes to an hour or longer in air or an oxidizing atmosphere, and then slow cooled or quenched to room temperature. However, the temperature at which the composition is fired is an important parameter, and must be kept within certain limits in order to practice the present invention.

In accordance with the teachings of the present invention, when the firing temperature is above 1350° C., and preferably 1450–1550° C., the following important changes are noted: (1) X-ray analysis shows that the material has a highly crystalline surface instead of an amorphous surface; (2) the material becomes extremely moisture sensitive; (3) the material exhibits an extremely small temperature coefficient. The high temperature limit is thus far undetermined, being limited by the melting point of the dielectric substrate. With melting the hygroscopic material diffuses into the substrate.

Figure 4:
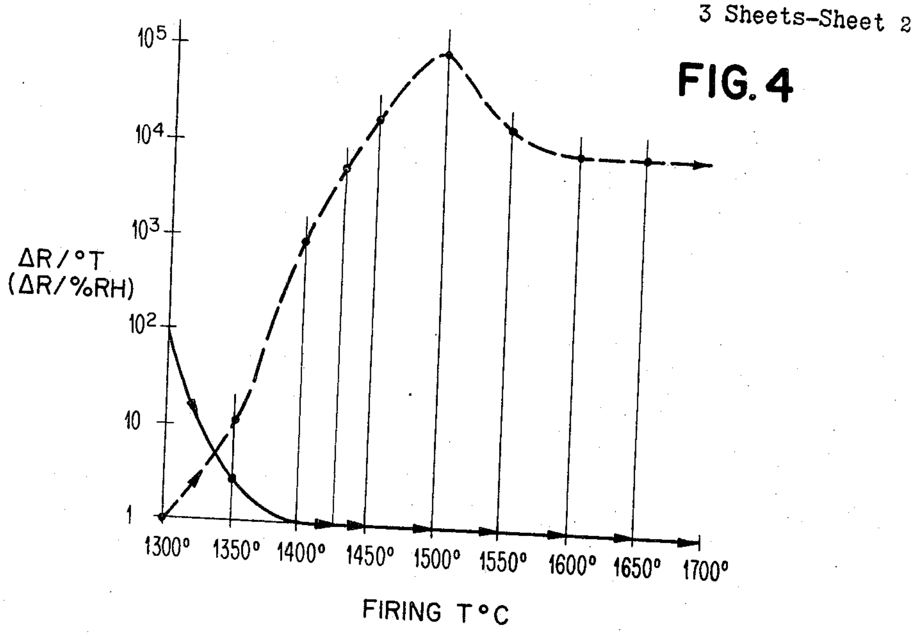
FIGURE 4 is a graphical illustration of the variations of thermal and humidity coefficients of resistance with change in firing temperature of the starting material used in the present invention.
Figure 3A:
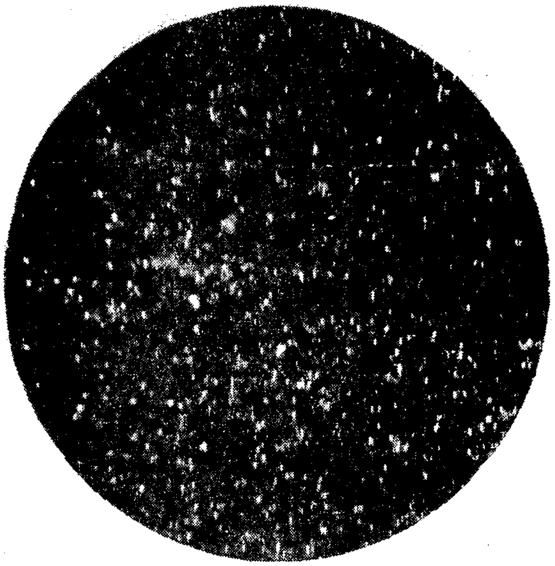
FIGURE 3A is a magnified view of a portion of the surface delineations of the hygroscopic element shown in FIGURE 2.
Figure 3B:
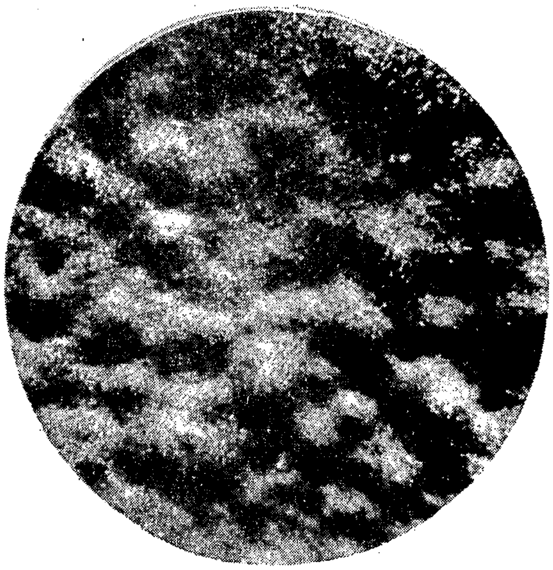
FIGURE 3B is a magnified view of a portion of the surface delineation of cobalt oxide powder fired to a temperature below 1350° C.

Referring now to FIGURE 3, it has been observed that with firing to temperatures above 1350° C. cobaltous oxide powder is present and exhibits a highly crystalline surface with epitaxially grown cubic crystals on the surface oriented in the 111 direction (FIGURE 3A), while when firing is at temperatures below 1350° C., for example, 1100–1300° C., cobalto-cobaltic oxide is present and exhibits an amorphous surface (FIGURE 3B). Reference will now be had to FIGURE 4 which is a plot of firing temperature of the cobalt oxide powder vs. thermal coefficient of resistance (the solid line) and humidity coefficient of resistance (the dashed line). Powder that has been fired at 1300° C. is extremely temperature dependent while insensitive to moisture, and exhibits excellent properties as a thermistor material. With 1350° C. firing, the powdered material's temperature dependency has decreased while it has now become somewhat moisture dependent. Powder fired above 1425° C. appears to be completely insensitive to temperature, with excellent moisture response, reaching a maximum level between 1450° C.–1550° C. It is believed that the change from a substance having an amorphous surface to one having a crystalline surface, by firing above 1350° C. and thereby converting the powder from cobalto-cobaltic oxide to cobaltous oxide is what imparts to the cobalt oxide powder its extremely stable, highly moisture sensitive properties.

To complete the hygrometer, electrodes 19 (FIGURE 2) must be applied to the hygroscopic element 14. Any metal such as platinum capable of conducting electricity can be used as the electrode material 20 and applied by silk screening or other conventional printing processes as step 21. After the drying step 22, the firing step 23 which includes the usual cycle of soaking, firing at 800° C. for 20 minutes, for example, and cooling to room temperature, completes the hygrometer.

In operation, a voltage is applied between the electrodes, which are separated from one another by the hygroscopic material. When a change in relative humidity takes place, a change in resistance and capacitance takes place, the amount of change being dependent on the amount of humidity increase or decrease. The hygrometer exhibits a simple exponential relationship with relative humidity decreasing 4 to 5 orders of magnitude in electrical resistance from 0 to 100% relative humidity.

The following examples are included merely to aid in the understanding of the invention, and variations may be made by one skilled in the art without departing from the spirit of the invention.

*Example A*

Heterogeneous cobalt oxide powder, obtained directly from commercially available sources, was mixed with a vehicle, in a 75/25%, by weight, ratio using mortar and pestle. This paste was silk screened onto a 96% alumina ceramic substrate. After screen removal the paste was dried in a circulating oven at 150° C. Thereafter the assembly was fired in an oven at 1300° C. for approximately one hour and then slow cooled to room temperature.

Glass fluxed platinum electrodes were applied by silk screen techniques, dried as above, fired for twenty minutes at 800° C. and cooled to room temperature. The resulting device was tested and found to have negligible moisture sensitivity, but an extremely high thermal coefficient of resistance, as indicated by the dot and arrowhead, respectively, at 1300° C. in the curves of FIGURE 4.

*Examples B through I*

A series of devices were made up according to the method of Example A, except that different firing temperatures of the cobalt oxide plate were used in each example, 1350, 1400, 1425, 1450, 1500, 1550, 1600, 1650° C. The results plotted in FIGURE 4, indicate that above 1425° C. the material is completely temperature insensitive, with excellent moisture response, reaching a maximum level between 1450° C.–1550° C.

The invention thus provides a hygrometer which is simple and inexpensive to manufacture, is extremely moisture sensitive and has a negligible temperature coefficient. It is compatible with microminiaturized circuit modules, has rapid response and resists moisture damage.

While the invention has been particularly shown and described with reference to the preferred embodiments thereof, it will be understood by those skilled in the art that various changes in form and detail may be made therein without departing from the spirit and scope of the invention.

What is claimed is:

1. In the method of forming a hygrometer the steps of:
mixing cobalt oxide powder with an inert liquid vehicle into paste form;
applying said paste to a dielectric;
firing said paste on said dielectric at a temperature above 1350° C., but below the melting point of said dielectric to form a hygroscopic element thereon; and
cooling said element to room temperature.

2. The method according to claim 1 further including the step of applying electrodes to said element to form said hygrometer.

3. The method according to claim 1 wherein said firing temperature is between 1450° C. and 1550° C.

4. A hygrometer including a dielectric having a hygroscopic material overlay thereon forming a hygroscopic element, said overlay comprising finely divided cobaltous oxide having a crystalline adsorbent surface.

5. The hygrometer according to claim 4 including electrodes applied to said dielectric, separated by and contiguous with said overlay.

References Cited

UNITED STATES PATENTS

| | | | |
|---|---|---|---|
| 1,708,073 | 4/1929 | Allen | 338—35 |
| 2,358,211 | 9/1944 | Christensen et al. | 252—519 |
| 2,414,793 | 1/1947 | Becker et al. | 252—518 |
| 2,626,445 | 1/1953 | Albers-Schoenberg | 252—518 |
| 2,633,521 | 3/1953 | Becker et al. | 252—514 |
| 2,674,583 | 4/1954 | Christensen | 252—519 |
| 3,045,198 | 7/1962 | Dolan et al. | 338—35 |
| 3,077,774 | 2/1963 | McIlvaine | 338—35 |

RICHARD M. WOOD, *Primary Examiner.*

A. BARTIS, *Examiner.*

W. D. BROOKS, *Assistant Examiner.*